May 12, 1931. M. CORNELL Re. 18,067

METER

Original Filed May 14, 1929

Inventor:
Mead Cornell

By
White, Frost, Fisher & Lothrop
Attorneys

Reissued May 12, 1931

Re. 18,067

UNITED STATES PATENT OFFICE

MEAD CORNELL, OF SAN FRANCISCO, CALIFORNIA, ASSIGNOR, BY MESNE ASSIGNMENTS, TO THE MERRILL COMPANY, OF SAN FRANCISCO, CALIFORNIA, A CORPORATION OF CALIFORNIA

METER

Original No. 1,753,552, dated April 8, 1930, Serial No. 363,016, filed May 14, 1929. Application for reissue filed June 10, 1930. Serial No. 460,241.

This invention relates to improvements in measuring apparatus particularly meters, and is designed for accurately measuring fluids of various viscosities particularly light to heavy oils while under flow.

The invention has for its principal objects to provide a meter of small size but of relatively large capacity; one which is extremely accurate in the measuring of fluids; one so constructed as to enable the measuring action to continue even though particles of foreign material may find their way into the measuring chamber and which would ordinarily stop the operation of the piston. A further object is to construct a meter wherein a plurality of parts are of duplicate or substantially duplicate structure, thus reducing the cost of manufacture of the meter. Other and important objects are to provide a meter having a novel form of reset for the indicating means; one having a pivoted bridge associated with the piston and one wherein loss of accuracy by friction is reduced to a minimum.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawing, wherein:—

Figure 1:
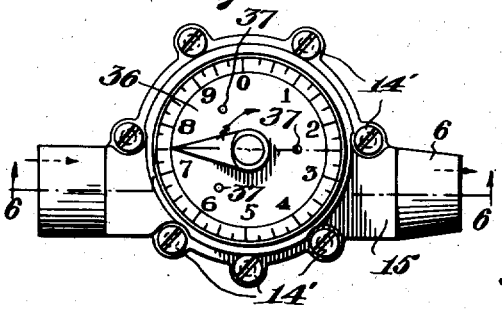
Figure 1 is a view in plan of the preferred embodiment of my invention.
Figure 2:
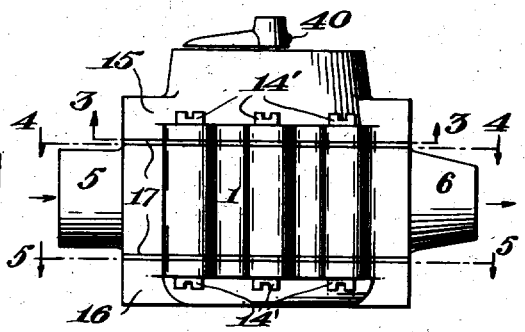
Figure 2 is a view in side elevation.
Figure 3:
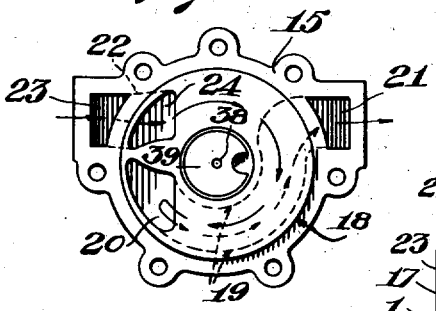
Figure 3 is a section on line 3—3—Fig. 2.

In the drawings, wherein like characters of reference designate corresponding parts, the numeral 1 indicates the body casting of a double piston meter provided on opposite faces with cored piston receiving chambers 2, circular in plan and separated by a wall 3 formed in its center with a ring bearing orifice 4. The casting 1 is formed at opposite sides with the fluid inlet orifice 5 and the outlet orifice 6. The interior of the casting is provided with a lateral orifice or passageway 7 opening to the top and bottom of the casting and connecting the fluid inlet therewith, and also with a lateral orifice or passageway 8 opening to the top and bottom of the casting and connecting the fluid outlet therewith.

Within the circular piston receiving chambers 2 are mounted the respective disk shaped pistons 9 of a diameter considerably less than the interior diameter of their respective chambers and each radially slotted to approximately its center, as at 10. The pistons are disposed in their respective chambers in superimposed relation, and are united by a piston pin 11 passing centrally therethrough and through a bearing aperture arranged eccentrically of a split bearing ring 12, rotatable within the ring bearing orifice 4 in the wall 3. Into each radial slot 10 of the respective pistons 9 extends a bridge 13 disposed vertically, one within each chamber 2 and mounted at one end to swing on a vertical fulcrum 14. The bridge affords an abutment against which the pressure of the fluid builds up when admitted into the chamber to act on the piston therein and cause its periphery to wipe about the peripheral edge of the chamber with the rotation of the split bearing 12 directing the wiping action or gyrating movement of the piston controlled thereby. During the wiping or gyrating movement of the piston a slight swinging movement is imparted to the abutment.

Figure 6:
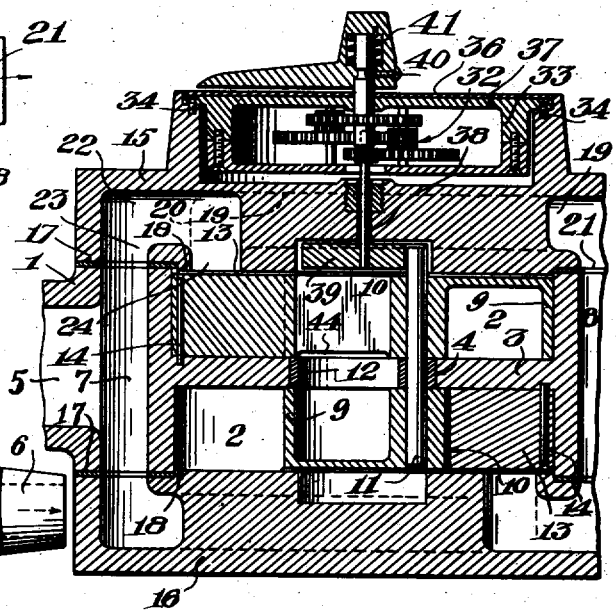
Figure 6 is a fragmentary sectional view on line 6—6—Fig. 1.
Figure 5:
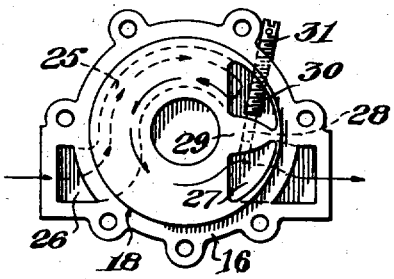
Figure 5 is a section on line 5—5—Fig. 2.

On opposite faces of the meter body casting are, removably secured by screws 14′, the cored or channelled top and bottom plates 15 and 16. Gaskets 17 are positioned between the respective plates and their associated faces of the body casting. One face of each plate is provided with a raised portion 18 circular in plan to fit in its associated chamber 2, Figs. 5 and 6, and center the respective end plates in position.

The top plate is provided with the cored fluid passage 19 connecting at its inlet end by port 20 with the interior of the upper valve chamber at one side of the bridge 13, and at its discharge end through the orifice or passageway 21 with the passage 8 in the body casting 1. The top plate is also provided with a cored channel or passageway 22 communicating at its inlet end 23 with the passage 7 in the body casting 1, and at its discharge end, by port 24, with the interior of the upper valve chamber at the other side of bridge 13. The fluid under pressure entering 24 through 7 and 23 acts on the periphery of the piston in the upper chamber to cause a gyrating thereof in its chamber and as the movement of the piston uncovers 20 the fluid escapes through 19 to 21 and outwardly through 8. Thus the fluid under pressure operating the piston is a uniform measured quantity at each revolution.

Should any hard substance lodge between the periphery of the piston and the peripheral wall of the chamber, or should a film of material build up between these surfaces the movement of the piston will not be impaired, as the slot in ring 12 will enable the yielding of the ring and permit an off axis movement of the pin 11.

The meter bottom plate 16 is provided interiorly with a cored channel or passageway 25 opening at its inlet end into the lower end of 7 through port 26 and at its opposite end opening into the lower valve chamber at one side of the bridge 13 at a point diametrically opposite port 20 in top cover plate 15. It is through this channel and ports that the fluid under pressure enters the lower valve chamber and acts on the lower piston, the fluid travelling in the direction of the solid line arrow, and passing from the chamber through the discharge port 27 which connects through channel 8 with outlet 6.

To render the meter accurate should any error take place in the actual quantity of material passing therethrough as compared with the quantity shown by the register, a by-pass port 28 is provided in the bridge wall 29 separating the discharge end of channel 25 from port 27. The flow of material through the by-pass port is controlled by the adjustment of a screw 30 which controls the orifice thereof. This screw falls short of extending through the outer wall of plate 16 and its end is sealed from tampering by a second or sealing screw 31 which is sealed in any suitable manner to a fixed part of the meter.

The meter is provided with an indicating mechanism for registering the fluid measured and this is illustrated as consisting of a gear train 32 within a split casing 33 which is removably held by screws 34 in a recess 35 formed in the upper surface of plate 15. The indicator plate 36 for the registering mechanism is riveted in position, as at 37, and its periphery covers the screws 34, precluding the removal of the split case by unauthorized persons. From the gear train there extends a spindle 38 connected with a peripherally notched disk 39 in the notch of which projects the upstanding end of the piston pin 11. The gyrating of the pistons and the rotation of the pin 11 will, through the gear train 32, cause the indicator hand to move over the plate 36 and indicate the fluid as measured. The hand is held to the upper end of the spindle 38 by a screw 40 and to the hand hub is secured one end of a spring 41 coiled about the spindle 38. In rotating the hand contra-clockwise to set the indicator to zero, the spring rotates freely about spindle 38, but if an attempt is made to operate the hand to a position in advance of its point of rotation the spring 41 will wind on the spindle and prevent such operation.

Figure 4:
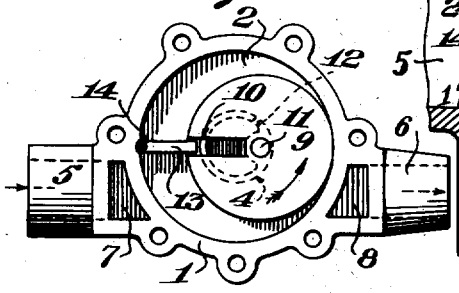
Figure 4 is a section on line 4—4—Fig. 2.

Operation of the meter can be summarized as follows:—Assuming that a source of fluid under pressure is connected to inlet 5 and that fluid is free to discharge from outlet 6, fluid flows from inlet 5, thru orifice 7, channel or passageway 22, port 24, to that portion of the upper chamber 2 upon one side of the upper piston 9. Because of the fluid pressure thereby exerted upon one side of the upper piston, this piston is caused to gyrate in one direction. As the upper piston 9 gyrates from the position shown in Fig. 6, the lower piston 9 is moved to uncover port 30 and therefore fluid flow also occurs from inlet 5 thru orifice 7, channel or passageway 25, port 30 into the lower chamber 2 at one side of the lower piston 9. Therefore the lower piston 9 is urged by fluid pressure to gyrate in the same direction with which the upper piston is urged. When the upper piston 9 has gyrated substantially 180° from the position shown in Fig. 4, port 24 is cut-off or closed. However the upper piston continues to gyrate because of the fluid pressure upon the lower piston. Upon further movement of the upper piston past the point at which ports 20 and 24 are closed, fluid is again introduced into the upper chamber 2 thru port 24 to effect another complete gyration of the upper piston. During each complete gyration of the upper piston, the quantity of fluid which flows into the upper chamber 2 during the preceding gyration, is discharged thru port 20, passageway 19, orifice 8, to the outflow 6. Likewise during each complete gyration of the lower piston, the quantity of fluid which flows into the lower chamber 2 during the preceding gyration is discharged thru port 27 to the outflow 6. During operation of the meter a certain amount of fluid flow can occur thru by-pass 28 as determined by the setting of screw 30.

In addition to the advantages and features which have been pointed out above, it should be noted that the use of two connected or duplex pistons permits an absolute cut-off of the inflow ports 24 and 30, and outlet ports 20 and 27. Such an absolute cut-off eliminates the possibility of direct flow of fluid thru the meter other than thru by-pass 28. The possibility of having a dead center position is obviated by the duplex piston arrangement. Furthermore the cut-off effected with respect to ports 20, 24, 27 and 30 is a shearing cut-off which is an advantage in handling viscous liquids, such as tar or lubricating greases. It should also be noted that fluid presents in slot 10 and within the cavities provided in pistons 9, present through leakage from chamber 2, will not interfere with proper movement of the pistons, due to the fact that such fluid is free to surge back and forth thru ring 12. In this connection it will be observed that spaces 44 permit flow of fluid between slot 10 and the cavities within the pistons.

I claim:

1. A meter for measuring fluids passing therethrough under pressure comprising a meter casing provided with a circular piston chamber, a piston within the chamber and of a diameter less than that of the chamber to permit a gyrating of the piston within said chamber, a ring bearing mounted for rotation centrally of said chamber, a connection between said ring and said piston, said connection being eccentric of the ring and axially of the piston, said piston being radially slotted, a bridge plate disposed vertically within the chamber and extending into said slot, said plate at its outer end fulcrumed to swing on a vertical axis, indicator mechanism operated by the movement of said piston, said casing provided with fluid inlet and outlet ports communicating with said chamber, one at each side of said bridge, said piston affording a valve for controlling the opening and closing of said ports.

2. A meter for measuring fluids passing therethrough under pressure comprising a meter casing provided with a circular piston chamber, a piston within the chamber and of a diameter less than that of the chamber to permit a gyrating of the piston within said chamber, a vertically split ring bearing mounted for rotation centrally of said chamber, a connection between said ring and said piston, said connection being eccentric of the ring and axially of the piston, said piston being radially slotted, a bridge plate disposed vertically within the chamber and extending into said slot, said plate at its outer end fulcrumed to swing on a vertical axis, indicator mechanism operated by the movement of said piston, said casing provided with fluid inlet and outlet ports communicating with said chamber, one at each side of said bridge, said piston affording a valve for controlling the opening and closing of said ports.

3. A meter for measuring fluids passing therethrough under pressure comprising a meter casing provided with a circular piston chamber, a piston within the chamber and of a diameter less than that of the chamber to permit a gyrating of the piston within said chamber, a ring bearing mounted for rotation centrally of said chamber, a connection between said ring and said piston, said connection being eccentric of the ring and axially of the piston, said piston being radially slotted, a bridge plate disposed vertically within the chamber and extending into said slot, said plate at its outer end fulcrumed to swing on a vertical axis, indicator mechanism operated by the movement of said piston, said casing provided with fluid inlet and outlet ports communicating with the interior of said chamber through its side wall, one at each side of said bridge, said piston in its movement alternately opening and closing said ports in succession.

4. A meter for measuring fluids passing therethrough under pressure comprising a meter casing provided with a circular piston chamber, a piston within the chamber and of a diameter less than that of the chamber to permit a gyrating of the piston within said chamber, a ring bearing mounted for rotation centrally of said chamber, a connection between said ring and said piston, said connection being eccentric of the ring and axially of the piston, said piston being radially slotted, a bridge plate disposed vertically within the chamber and extending into said slot, said plate at its outer end fulcrumed to swing on a vertical axis, indicator mechanism operated by the movement of said piston, said casing provided with fluid inlet and outlet ports communicating with said chamber, one at each side of said bridge, said piston affording a valve for controlling the opening and closing of said ports, a by-pass between said ports whereby fluid passes from one to the other independently of the controlling of said ports, and means for controlling said by-pass.

5. A meter for measuring fluid passing therethrough under pressure comprising a meter casing provided with a circular piston chamber, a piston within the chamber and of a diameter less than that of the chamber to permit a gyrating of the piston within the chamber, a bearing member journaled to rotate upon an axis concentric to the chamber, a connection between said bearing member and said piston, said connection being excentric to the axis of the chamber and axially of the piston, said bearing member having sufficient resilience or give to enable the piston to pass an obstruction in said chamber, a bridge plate disposed within the casing, said plate extending between the periphery of the chamber and the periphery of the piston and being disposed vertically within the chamber, and indicating mechanism operated by movement of said piston, said casing being provided with fluid inlet and outlet ports communicating with said chamber, one at each side of said bridge, said piston affording a valve for controlling the opening and closing of said ports.

6. A meter for measuring fluid passing therethrough comprising a meter casing provided with a circular piston chamber, a piston within the chamber and of a diameter less than that of the chamber to permit a gyrating of the piston within the chamber, a split ring bearing journaled to rotate about an axis concentric to the chamber, a connection between said bearing member and said piston, said connection being excentric to the axis of the chamber and axially of the piston, a bridge plate disposed within the casing, said plate extending between the periphery of the chamber and the outer periphery of the piston, indicating mechanism operated by the movement of the piston, said casing being provided with fluid inlet and outlet ports communicating with said chamber, one at each side of said bridge, said piston affording a valve for controlling the opening and closing of said ports.

7. In a meter for measuring fluids passing therethrough, a casing provided with a piston chamber, said casing also having fluid inlet and outlet orifices, a piston within said chamber and of substantially less diameter than that of the chamber, said piston having a radial slot formed within the same, a bridge plate disposed vertically within the chamber and extending into said slot, said plate being fulcrumed to the casing to swing on a vertical axis, means for causing flow of fluid thru the casing to effect a gyrating movement of the piston within the same, and indicating means operated by movement of the piston.

8. In a meter for measuring fluid passing therethrough, a casing provided with two axially alined circular piston chambers, said casing having inlet and outlet orifices, a piston disposed in each of said chambers, each piston being of a diameter less than that of its corresponding chamber to permit a gyrating of each piston within its respective chamber, a pin extending axially of both pistons and connecting said pistons together, a bearing member journaled to the casing and connected with said pin, said bearing member being adapted to rotate about an axis concentric with said chambers and having sufficient resilience or give to permit substantial lateral movement of the pin toward the axis of the chambers whereby either of said pistons can pass an obstruction in its respective chamber, and means for causing fluid flow thru said casing to effect gyration of both said pistons.

9. A meter for measuring fluid passing therethrough under pressure comprising a meter casing provided with a circular piston chamber, a piston within the chamber and of a diameter less than that of the chamber to permit a gyrating of the piston within said chamber, a ring bearing mounted for rotation centrally of said chamber, a connection between said ring and said piston, said connection being excentric of the ring and axially of the piston, said piston being radially slotted, a bridge plate disposed vertically within the chamber and extending into said slot, said plate at its outer end fulcrumed to swing on a vertical axis, said casing being provided with fluid inlet and outlet ports communicating with said chamber, one at each side of said bridge, said piston affording a valve for controlling the opening and closing of said ports.

10. In a meter for measuring fluid passing therethrough, a casing provided with a pair of superposed circular piston chambers, each of said chambers having parallel flat side walls, said casing having inlet and outlet orifices, circular pistons disposed within said chambers, each piston being of a diameter less than that of its corresponding chamber to permit a gyrating of each piston within its respective chamber, means connected to said pistons whereby they are caused to move in unison, and bridge plates disposed within said chambers, each plate being arranged vertically and extending from one wall of the corresponding chamber to the periphery of the corresponding piston, said casing having two pairs of inlet and outlet ports communicating with the inflow and outflow orifices, each set of said ports communicating with the interior of its corresponding chamber thru one flat side wall thereof and being upon opposite sides of the corresponding bridge plate, said pistons in their gyrating movements serving to open and close said ports in succession.

11. In a meter for measuring fluid passing therethrough, a casing provided with a pair of superposed circular piston chambers, said casing having inlet and outlet orifices, pistons disposed within said chambers, each piston being of a diameter less than that of its corresponding chamber to permit a gyrating of each piston within its respective chamber, bridge plates pivotally connected to the casing and disposed within said chambers, each piston being slotted to receive a corresponding bridge plate, said casing being formed with two sets of fluid inlet and outlet ports in the walls of the chambers and communicating with the inflow and outflow orifices, one set of said ports being provided for each chamber, and means for connecting said pistons whereby they are caused to move in unison, said slots being in communication thru an opening in said casing.

In witness whereof, I have hereunto set my hand.

MEAD CORNELL.